(12) United States Patent
Sandler et al.

(10) Patent No.: US 9,313,602 B2
(45) Date of Patent: Apr. 12, 2016

(54) REMOTELY ACCESSING A COMPUTER SYSTEM

(71) Applicant: BETA BRAIN, INC., Hallandale Beach, FL (US)

(72) Inventors: Nathan Sandler, Hallandale, FL (US); Paula Dandreamatteo, Hallandale, FL (US)

(73) Assignee: BETA BRAIN, INC., Hallandale Beach, FL (US)

( * ) Notice: Subject to any disclaimer, the term of this patent is extended or adjusted under 35 U.S.C. 154(b) by 634 days.

(21) Appl. No.: 13/798,272

(22) Filed: Mar. 13, 2013

(65) Prior Publication Data

US 2014/0115487 A1    Apr. 24, 2014

Related U.S. Application Data

(60) Provisional application No. 61/717,689, filed on Oct. 24, 2012.

(51) Int. Cl.
| | |
|---|---|
| *G06F 3/0484* | (2013.01) |
| *G06F 15/16* | (2006.01) |
| *H04W 4/00* | (2009.01) |
| *H04M 1/725* | (2006.01) |
| *H04W 4/18* | (2009.01) |

(52) U.S. Cl.
CPC .............. *H04W 4/00* (2013.01); *H04M 1/7253* (2013.01); *H04M 1/72533* (2013.01); *H04W 4/008* (2013.01); *H04W 4/18* (2013.01)

(58) Field of Classification Search
CPC ........... G06F 3/00; G06F 3/011; G06F 3/048; G06F 3/038; G06F 3/0481; G06F 3/0482; G06F 3/0484; G06F 3/0488; G06F 3/0202; G06F 3/03543; G06F 15/16; G06F 1/163; G06F 1/1626; G06Q 10/10; H04L 29/06; H04L 29/08072; H04N 7/15
See application file for complete search history.

(56) References Cited

U.S. PATENT DOCUMENTS

| | | | |
|---|---|---|---|
| 5,379,409 | A | 1/1995 | Ishikawa |
| 5,440,699 | A | 8/1995 | Farrand et al. |
| 5,499,377 | A | 3/1996 | Lee |
| 5,732,212 | A | 3/1998 | Perholtz et al. |
| 5,799,068 | A | 8/1998 | Kikinis et al. |
| 5,937,176 | A | 8/1999 | Beasley et al. |
| 6,366,951 | B1 | 4/2002 | Schmidt |
| 6,681,250 | B1 | 1/2004 | Thomas et al. |
| 6,701,380 | B2 | 3/2004 | Schneider et al. |
| 6,850,149 | B2 | 2/2005 | Park |

(Continued)

*Primary Examiner* — Xiomar L Bautista
(74) *Attorney, Agent, or Firm* — Fleit Gibbons Gutman Bongini & Bianco PL; Paul D. Bianco; Gary S. Winer (57) ABSTRACT

An intermediary interface system allow for remote servicing of a computer in a local customer system by a remote representative system even if the local customer system does not have a network connection to the remote representative system. The intermediary interface system includes a smartphone and a dongle. The dongle interfaces video output and keyboard and mouse inputs of the local customer system with the smartphone. The smartphone wirelessly interfaces the dongle with the remote representative system. Thus, the representative system displays the video signal from the local customer system for analysis and sends keyboard and mouse signals to the local customer system in response without requiring a network connection between the local customer system and the remote representative system.

18 Claims, 7 Drawing Sheets

(56) References Cited

U.S. PATENT DOCUMENTS

| | | |
|---|---|---|
| 7,194,259 B2 | 3/2007 | DeLine |
| 7,301,935 B1 | 11/2007 | Chaturvedi et al. |
| 7,436,300 B2 | 10/2008 | Glass et al. |
| 7,493,384 B1 | 2/2009 | Philyaw |
| 7,512,704 B2 | 3/2009 | Nelson et al. |
| 7,609,824 B2 | 10/2009 | Stepanian |
| 7,634,780 B2 | 12/2009 | Rhoten et al. |
| 7,747,702 B2 | 6/2010 | Anderson et al. |
| 7,792,924 B2 * | 9/2010 | Liu .............. H04L 67/025 709/206 |
| 7,826,203 B2 | 11/2010 | McCoy |
| 7,853,663 B2 | 12/2010 | Hoerl et al. |
| 7,853,740 B2 | 12/2010 | Liaw et al. |
| 7,949,708 B2 | 5/2011 | Wang et al. |
| 8,091,005 B2 | 1/2012 | Huntly-Playle et al. |
| 8,176,155 B2 | 5/2012 | Yang et al. |
| 8,200,825 B2 | 6/2012 | Bates et al. |
| 8,200,867 B2 | 6/2012 | Katayama et al. |
| 2004/0042547 A1 | 3/2004 | Coleman |
| 2005/0114894 A1 | 5/2005 | Hoerl |
| 2007/0022176 A1 | 1/2007 | Kobayashi |
| 2008/0014910 A1 | 1/2008 | Hsu et al. |
| 2009/0303098 A1 * | 12/2009 | Wilkins ............ H04M 1/72533 341/176 |
| 2010/0023531 A1 | 1/2010 | Brisebois et al. |
| 2010/0138748 A1 | 6/2010 | Sankararao et al. |
| 2010/0260173 A1 | 10/2010 | Johnson |
| 2011/0157480 A1 | 6/2011 | Curl |
| 2012/0047277 A1 | 2/2012 | Keidar et al. |

* cited by examiner

REMOTELY ACCESSING A COMPUTER SYSTEM

FIELD OF THE DISCLOSURE

The present disclosure relates to remote access of a computer system without requiring a network connection to the computer system.

BACKGROUND

Information Technology (IT) companies (or departments) that manage computer systems are often challenged with the need to provide timely, secure, and cost-effective support. Remote support provides the means for IT professionals to remotely access and control customers' computer systems. This eliminates the need for these professionals to physically travel onsite to address a problem, thereby minimizing delay in response time. Remote support approaches operate under the condition that the device requiring remote support has an existing and functional conventional network connection. A conventional network connection allows for a multitude of functionality such allowing the computer system to access to remote database information, invoke remote or processes or programs, download content or software, or surf the internet. Conventional remote support relies upon the assumption that the computer is able to connect to a network such as the Internet or to any other Wide Area Network (WAN) so that it may be remotely accessible to IT support staff. Such staff may then connect, and operate the remote computer with a goal of understanding and repairing a problem, or instructing the user with respect to the problem. After resolution of the problem, the IT support staff disconnects its remote access, and the user may resume normal operation of the computer.

However, there are situations when a problem with the computer system is related to the network access or the computer system operates as a standalone system without a network connection, or has limited connectivity which does not allow a network connection to the remote support resources. In such situations, the benefits of remote IT support utilizing remote access is unavailable to the user of the problem computer system.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

The present disclosure provides an improved device management system that enables a user to control remote computers, accessing them via a mobile data network using a cloud controller, and allows information technology (IT) personnel to support remote users without having to travel to the remote computer site, and without requiring the remote computer to be capable of connecting to a network such as the internet, or connecting to another network to establish a conventional network connection between remote computers.

The present disclosure includes a description of a method for providing remote support service for a local customer system, the method includes connecting a remote representative system with a cloud controller, the cloud controller in communication with an electronic device, thereby permitting the electronic device to communicate with the remote representative system; connecting a dongle, in communication with the local customer system, with the electronic device; and permitting, through the cloud control and the dongle, control and access to the local customer system by the remote representative system, wherein the cloud controller is configured to centrally manage, log, and route all screen updates and activities of the local customer system to the remote representative system.

The present disclosure includes a description of a method for providing customer support from a remote representative system to a local customer system, the method operating within an intermediary interface system locally coupled to the local customer system and wirelessly coupled to the remote representative system, the method comprising: receiving a video signal from the local customer system; wirelessly transmitting the video signal to the remote representative system; wirelessly receiving a remote user input signal from the remote representative system; formatting the remote user input signals to correspond to a user input signal originating from a hardware user interface device locally coupled to the local customer system, and transmitting the hardware user input signal to the to the local customer system.

The present disclosure includes a description of a durable, non-transitory computer readable storage medium comprising a computer program which instructs a computer to perform a method comprising: receiving a video signal from a local customer system; wirelessly transmitting the video signal to a remote representative system; wirelessly receiving a remote user input signal from the remote representative system; formatting the remote user input signal to correspond to a user input signal originating from a hardware user interface device locally coupled to the local customer system, and transmitting the hardware user input signal to the to the local customer system.

The present disclosure includes a description of a dongle device for facilitating provision of customer support from a remote representative system to a local customer system, the device comprising: a dongle port for providing a wire interface to a video output port and an at least one user input port of the local customer system, the dongle port for receiving a video signal from the video port and for transmitting a hardware user input signal to the local customer system; a modular connection interface for providing an interface between the dongle device and a wireless transceiver, the wireless transceiver wirelessly coupled to the remote representative system; and a module operating within the wireless transceiver for instructing a computer within the wireless device to cause the wireless device to receive the video signal from the dongle device, wirelessly transmit the video signal to the remote representative system, wirelessly receive a remote user input from the remote representative system, and transmit the remote user input signals to the dongle device.

The present disclosure includes a description of a method for providing remote support service for a local customer system, the method including connecting a representative system with a cloud controller, the cloud controller in communication with an electronic device, thereby permitting the electronic device to communicating with the representative system; connecting a dongle, in communication with the local customer system, with the electronic device; and permitting, through the cloud control and the dongle, control and access to the local customer system by the representative system, wherein the cloud controller is configured to centrally manage, log, and route all screen updates and activities of the local customer system to the representative system.

The present disclosure includes a description of a communication system comprising: a customer computer system having no connection to a WAN; an apparatus connected to the local customer system; an electronic device communicable with the apparatus and also communicable with a cloud control through the WAN; and a representative computer system connected to the cloud control, wherein the representative computer system is communicable to the customer computer system through the apparatus, the electronic device, and the cloud control.

The present disclosure includes a description of a method for establishing communication between a first computer system and a second computer system using a WAN, the first system unable to communicate to the WAN, the method comprising: connecting a first device to the first computer system, the first device configured to communicate output signals between the first computer system and the first device, establishing a first connection link between the first device and at least one second device; establishing a second connection link between the second computer system and a cloud control; establishing a third connection link between the cloud control and the at least one second device; and executing software stored on the at least one second device, the software stored on non-volatile storage and configured to communicate with the first device through the first connection link as well as to communicate with the cloud control the third connection link, thereby permitting communication between the first and second computer systems.

As required, detailed descriptions are disclosed herein; however, it is to be understood that the disclosed descriptions are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

Figure 1A:
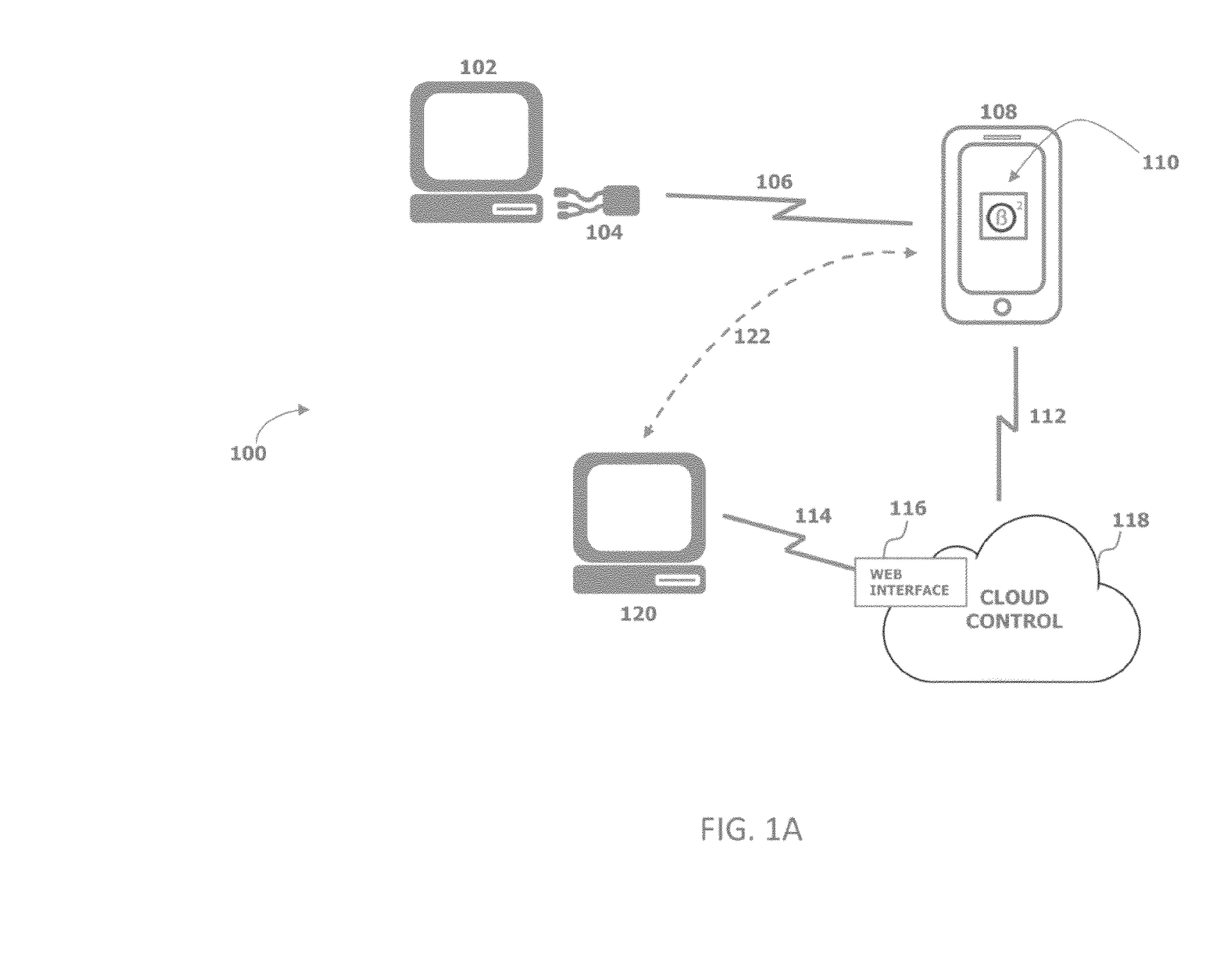
FIGS. 1A-1C illustrate a communication system in accordance the disclosure.
Figure 1B:
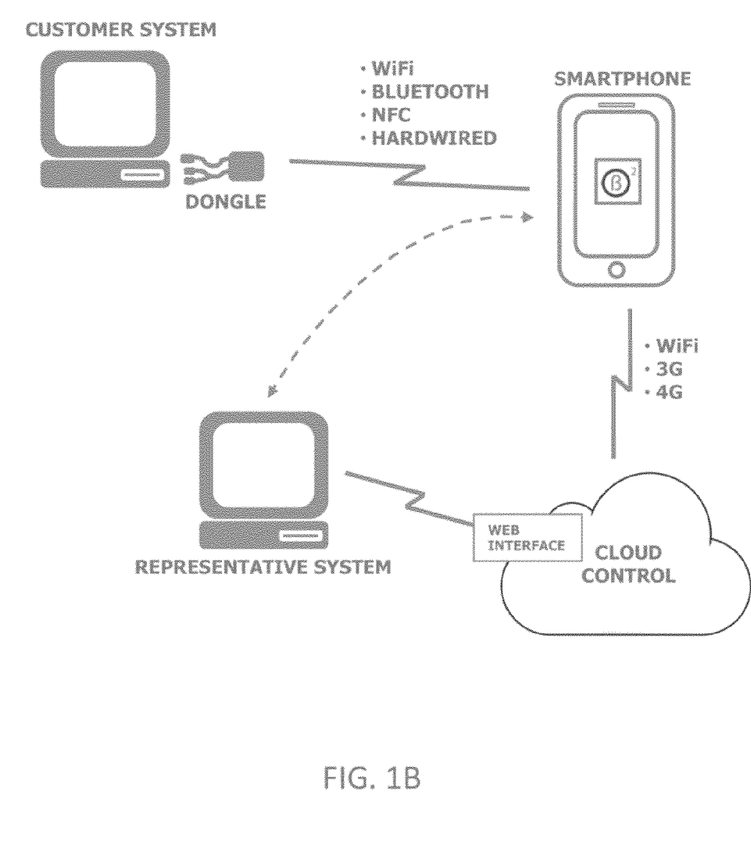
Figure 1C:
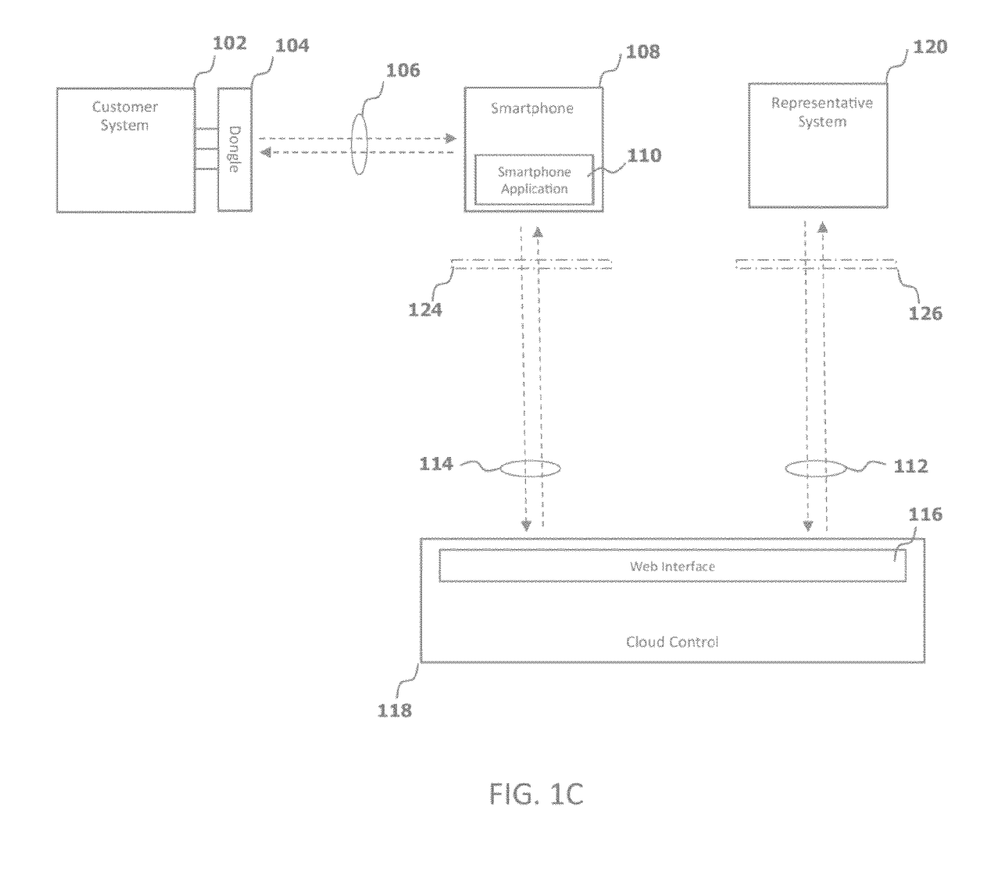

In reference now to FIGS. 1A-1C, a communication system 100 is described with respect to a remote representative system (e.g. technical support) facilitated by a in intermediary interface system including Smartphone 108 along with a Smartphone Application 110 and a hardware apparatus device or dongle 104. The intermediary interface system is situated, between the remote representative system 120 and a local customer system 102. Although the description illustrated utilizes a Smartphone 108 and Smartphone Application 110, it should be understood that other electronic devices and software applications are contemplated within examples of the disclosure. The Smartphone application 110 is configured to communicate via WiFi, Bluetooth, NFC, USB, hard wire, or other known or to be developed communications means, to dongle 104, providing remote access and control of local customer system 102 by remote representative system 120, even when local customer system 102 has no connectivity to a network (the Internet, a LAN, etc.) using its built-in or otherwise normal network communication approaches. The dongle 104 is connected to the local customer system 102 by connection to a local interface, such as USB or other serial or parallel interface, or by a local wireless interface such as WiFi or Bluetooth. The dongle is paired to the Smartphone 108 via a second interface, so that it can receive and transmit information, such as data packets, from and to the local customer system 102 and the smartphone 108.

Specifically the dongle 104 transmits output signals, such as those provided by a keyboard or cursor control device signals, for example as data packets, such as TCP/IP data packets, through hard wires or another connection means described herein to the local customer system 102. Simultaneously, the dongle 104 transmits additional output signals, such as compressed video data signals and cursor control device signals, as necessary, which also can be TCP/IP data packets, to the representative system 120 via Smartphone 108. Thus, the system of the present disclosure can enable a representative at remote representative system 120 to view and control a local customer system 102 via a wireless communication path even when the local customer system 102 has no connectivity to any non-local network (the Internet, an external LAN, etc.) using its internal or normal operations methods. The interface between the dongle and the local customer system is different from a normal network connection as access to databases and network resources are not facilitated. Rather, the dongle appears as a keyboard and pointing device, such as a mouse, and a monitor to the local customer system, and in implementation, the only signals received by the local customer system from the remote representative system are the remote user input signals. This eliminates a number of issues of requiring the establishment of network connectivity before rendering customer support for the local customer system from the remote representative system.

It will thus be appreciated that dongle 104 can provide a connection between smartphone 108, which may be connected to or connectable with the internet or another external network, and local customer system 102, thereby permitting a representative operating within remote representative system 120 to communicate with local customer system 102, through device or smartphone 108 and device or dongle 104, as facilitated by cloud control 118 and software 110. Accordingly, a user or representative at the representative system 120 may select and subsequently control a local customer system 102 when local customer system 102 has no connectivity to any network, other than any communications means or connectivity established by connecting dongle 104. The remote representative system 120 will be able to select the local customer system 102 once the customer using local customer system 102 has initiated a request for support by launching the smartphone application 110. Alternatively, an automatic system in contemplated within the disclosure where local customer system 102 self-detects a problem, through known or to be developed detection means including, for example a self-diagnostic application, and automatically searches for and connects to device 108, through device or dongle 104, thereby initiating application 110 or alerting the customer to initiate application 110. The remote representative system 120 may further display a menu or list of available local customer systems 102 requesting support.

The smartphone includes a wireless radio frequency transceiver (not shown) for interfacing with a cellular system and/or a WiFi system for coupling with the remote representative system in a manner know to those familiar with the art.

Also, the smartphone includes a microphone (not shown) for receiving a customer audio signal and speaker (not shown) annunciating a remote representative audio signal, thereby allowing the customer support function from the remote representative system to speak with the user of the local customer system while providing support. For example the user could hear a request annunciated by the speaker, the request coming from a representative from the remote representative system, the request being for example to check connections or reset peripherals. The user could then annunciate a response which is received by the microphone and communicated to the representative at the remote representative system. Also, the smartphone includes a display and camera (not shown) which may be further used in the customer service or to simplify the components of the intermediate interface system including the dongle 104 and smartphone 108.

Figure 2:
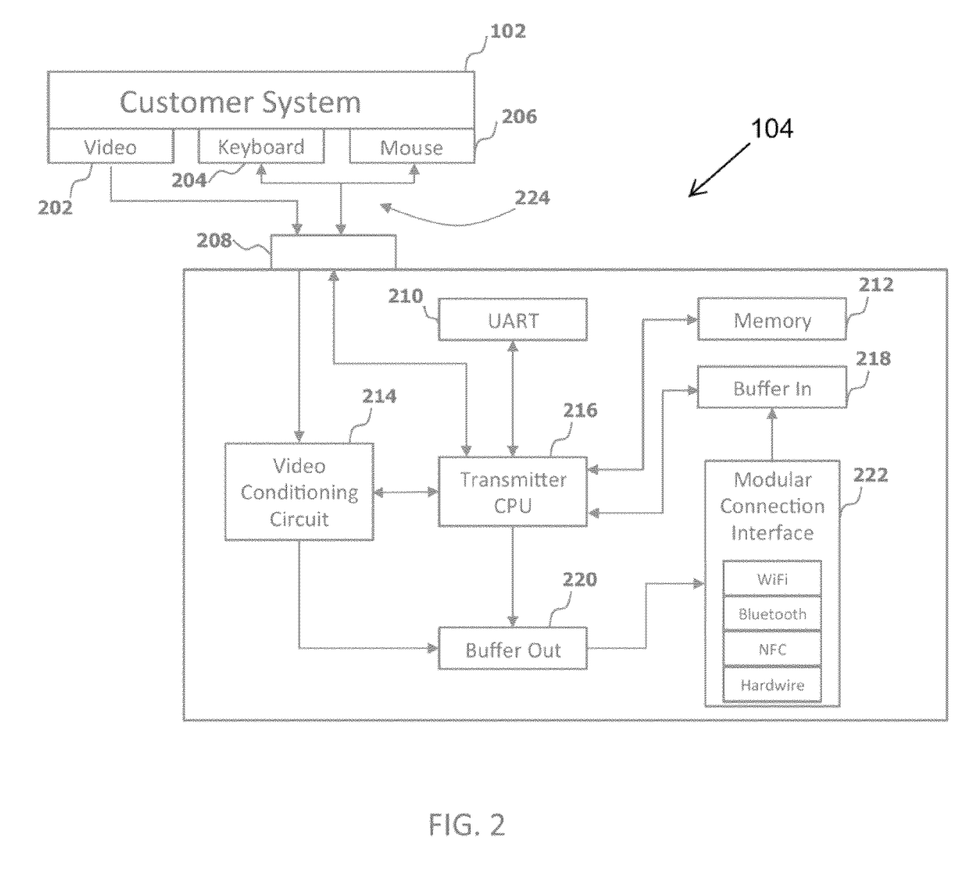
FIG. 2 shows a representative description of a dongle in accordance with the disclosure.

Referring next to FIG. 2, the illustrated description of dongle 104 includes a Keyboard Video Mouse (KVM) port 208 to communicate with video port 202, keyboard port 204, and mouse input port 206 of the local customer system 102. Keyboard and mouse are user input devices and keyboard port 204 (as well as mouse port 206) us a user input device input port. During operation, dongle 104 receives unidirectional, as illustrated, or bidirectional video signals from local customer system 102, for example through cable 224. Dongle 104 may also transmit keyboard and mouse signals to keyboard port 204 and mouse port 206 through cable 224. Keyboard and mouse device signals can be wirelessly transmitted (via WiFi, Bluetooth, NFC) bidirectionally between dongle 104 and Smartphone 108. Video signals are unidirectionally transmitted from local customer system 102 to dongle 104 and from dongle 104 to Smartphone 108. To accomplish the transmission of video, keyboard and mouse device data, dongle 104 may include video conditioning circuit 214 for conditioning the video for transmission by the smartphone, dongle CPU 216, buffer in 218, buffer out 220, UART 210, memory 212, and modular connection interface 222. Modular connection interface 222 enables dongle 104 to communicate over wireless communication path 106 with representative system 120 via a Smartphone 108.

In one exemplary system, local customer system 102 provides power to dongle 104. Alternatively, dongle 104 may include a separate connector for connecting to a power supply or a battery pack and can operate to provide charge or power to system 102.

In one or more exemplary systems, dongle 104 is compatible with all commonly used computer operating systems and protocols, including but not limited to those manufactured by Microsoft® (Windows®), Apple® (Macintosh®), Linux®, Sun® (Solaris®), DEC®, Compaq® (Alpha), IBM® (RS/6000), HP® (HP9000), and SGI® (IRIX). Dongle 104 may also implement encrypted or secure wireless transmission in accordance with standards for secure wireless transmission of data known or to be developed.

Figure 3:
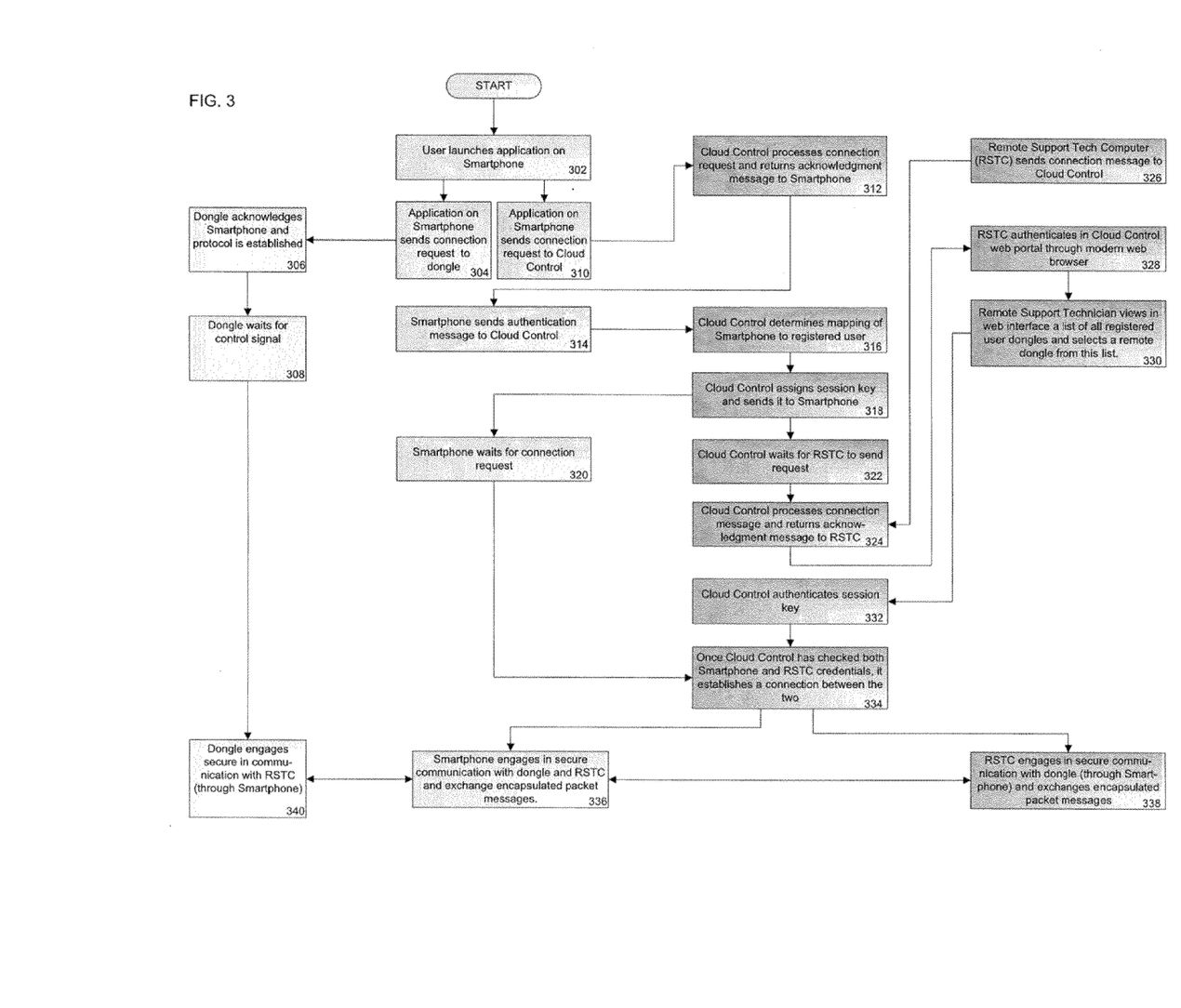
FIG. 3 shows a representative description of a flowchart illustrating operation of the system of FIGS. 1A-1C.

The flow chart of FIG. 3 depicts the process for establishing secure communication between the representative system 120 and the local customer system 102 via the dongle 104, the Smartphone 108 and the Smartphone application 110.

In this example, the representative system 120 provides a remote support mechanism that is secure to one or more local customer systems 102 over a mobile data network 112, for example a 3G or 4G wireless, using Smartphone 108 and dongle 104. Alternatively, the mobile device 108 may communicate over a data network 114 that can be an internetwork, such as the global Internet, or a private network, via any other means. The traffic between the representative system 120 and any local customer system 102 is handled and managed at the cloud control 118. In another example, the cloud control 118 is managed by an administrator, who can access the cloud control 118 using a graphical user interface (GUI), such as a web interface 116. The cloud control 118 thus has the capability of allowing global on demand use from anywhere in the world connected to the cloud. The representative system 120 may provide remote support to the local customer system 102 by establishing a session using the cloud control 118 via the web interface 116. Additionally, a local customer system 102 will request a remote session using the Smartphone 108 and may download a Smartphone application 110 to launch the service request. Smartphone application 110 transmits a remote session request to the cloud control 118 via a cellular network using any of the cell phone mobile communication standards (e.g. 3G, 4G) or via WiFi. Examples of these processes are described below with respect to FIG. 4 and FIG. 5. Once the support representative has provided the necessary support to the remote customer, the remote session may be ended automatically or manually.

The cloud control 118 may advantageously provide management functions including the management of one or more representatives via the web interface 116. The administrator and the representatives using representative system 120 may log into the cloud control 118 via the web interface 116 by using a public Uniform Resource Locator (URL) address, without the need for installing any kind of application in the administrator or representatives systems. In one example the representative system 120 can communicate with the local customer system 102 using the cloud control 118 through one or more firewalls 124 and 126 over secure links 114 and 112. The firewalls 124 and 126 may be implemented at the representative's site, at the remote customer's site, or at both sites. Alternatively, no firewall may exist at all.

Each support session is initiated by the smartphone application 110 when a support issue occurs and may then be discontinued automatically or manually when the session is complete. The cloud control 118 contains software applications that can receive, handle, manage and dispatch system or data messages to and from the representative and local customer systems via secure links 114 and 112.

The architecture of the example is formed based on a message routing and handling system which can include one or more software modules. This system allows the routing of data among the cloud control 118, the remote representative system 120 and the local customer system 102.

In an exemplary description, the web interface 116 includes a network configuration web interface and a user/admin web interface (which includes but is not limited to user profile configuration, log reporting interface, and administrative user interface).

The Secure Sockets Layer (SSL) module X ensures that the data transfer between the cloud control 118 and the remote representative system and the local customer system is encrypted over links 114 and 112.

Figure 4:
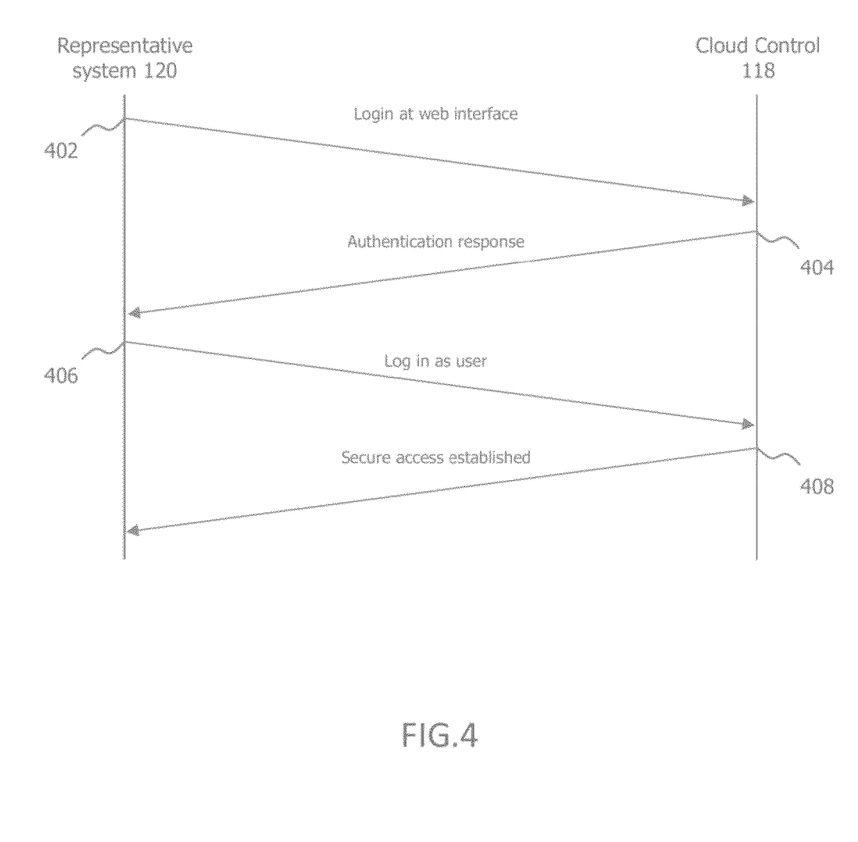
FIG. 4 shows a representative description of a ladder diagram of a process for establishing secure communication between the cloud control and the remote representative system.

FIG. 4 is a ladder diagram of a process for establishing secure communication between the cloud control 118 and the remote representative system 120. In step 402, a representative utilizing the remote representative system 120 can visit the web interface 116 of cloud control 118 by entering a public URL and supply login information. Once the remote representative system 120 is authenticated 404 through acknowledgement of an authentication response, the secure access in granted and the remote representative system 120 can access the application program to provide customer support 408.

The above process establishes the segment of a secure communications link from the remote representative system 120 to the cloud control 118. Next, a secure communication link session can be established between the cloud control 118 and the local customer system 102, through the Smartphone 108 and the dongle 104.

Figure 5:
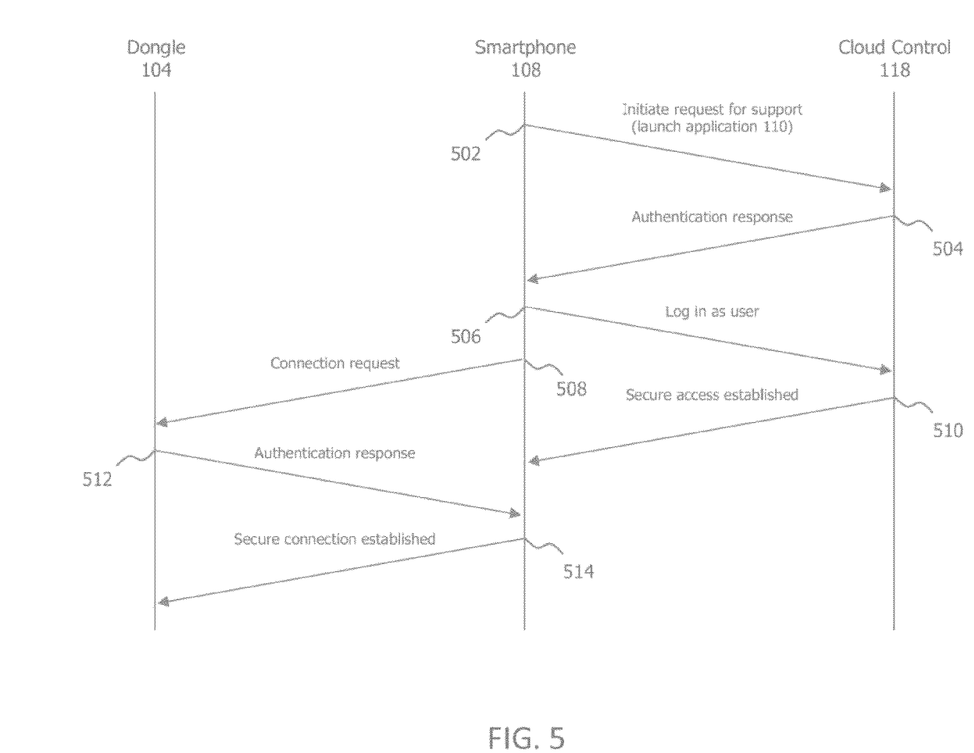
FIG. 5 shows a representative description of a ladder diagram of a process for establishing secure communication between the cloud control and the local customer system.

FIG. 5 is a ladder diagram of a process for establishing secure communication between the cloud control 118 and the local customer system 102, according to an implementation of the disclosure. As described herein, a customer can initiate the support session. For this to occur, the customer can launch the application 110 on the Smartphone 108. Via this interface, the Smartphone 108 submits a request for support, as in step 502, a session initiation request to the cloud control 118. The cloud control 118 sends an authentication response, step 504, and grants secure access to the application program that will provide support through link 112. In step 508 the Smartphone sends a connection request message to the dongle 104. Once the dongle 104 sends an authentication response and accepts the connection request, a secure connection 106 is established between the Smartphone 108 and the dongle 104, at 514. This connection 106 can be established either via Bluetooth, WiFi, NFC hardwire, or other known or to be developed connection means. Once the secure connection 106 and link 112 have been established at step 510, remote representative system 120 can securely access local customer system 102 to provide support.

The disclosure thus enables remote access of a computer or server over a mobile data network (3G, 4G, etc.) using a cloud controller. Accordingly, an improved device management system is provided that enables a user to control remote computers accessing them via a mobile data network and the cloud controller. Communication system 100, and the associated method of the disclosure, further allow information technology (IT) personnel to easily support remote users without having to travel to the site or establish a conventional network connection between the local customer system and the remote representative system. It should be also appreciated that the system and methods described herein may be platform independent in order to simultaneously support a variety of platforms.

In another example, those familiar with the art will appreciate that the smartphone camera on can be used to record the video signal from a monitor of the local customer system, thereby eliminating any need to couple to the video port of the local customer system. Furthermore, user input processes of the dongle can be incorporated in the application 110 of the smartphone 108 which is capable and communicated to the local customer system using the same interfaces as described with respect to the dongle. Thus, in one example, the processes of dongle 104 can be implemented with the smartphone camera and further functionality added to smartphone application software 110.

While the present disclosure has been described as merely exemplary and is not intended to be limiting or represent exhaustive enumerations of all aspects of the disclosure. The scope of the disclosure, therefore, shall be defined apparent to those of skill in the art that numerous changes may be made in such details without departing from the principles of the disclosure. It should be appreciated that the present disclosure is capable of being implemented in other forms without departing from its essential characteristics.

The terms and phrases used herein are not intended to be limiting, but rather, to provide an understandable description. Additionally, unless otherwise specifically expressed or clearly understood from the context of use, a term as used herein describes the singular or the plural of that term.

Smartphone 108 may be any portable or wireless device such as a PDA, PIM, cell phone, feature, smartphone, super phone, electronic book, tablet, laptop, ultra-book or other such portable device able to load application 110 and form a network connection with the remote representative system. Such portable devices have operating systems provided by entities such as Microsoft, Apple, Google, Nokia, BlackBerry, Palm, General Magic or others.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

The terms "controller", "computer", "server", "client", "computer system", "computing system", "personal computing system", or "processing system" describe examples of a suitably configured processing system adapted to implement one or more implementations of the present disclosure. Any suitably configured processing system is similarly able to be used by implementations of the present disclosure, for example and not for limitation, a personal computer, a laptop computer, a tablet computer, a personal digital assistant, a workstation, or the like. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more implementations of the present disclosure. The terms "network", "computer network", "computing network", and "communication network", describe examples of a collection of computers and devices interconnected by communications channels that facilitate communications among users and allows users to share resources.

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of computer instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, computer instructions, messages or message packets, and other computer readable information from the computer readable medium. The computer readable medium may include computer readable storage medium tangibly embodying non-volatile memory, such as read-only memory (ROM), flash memory, disk drive memory, CD-ROM, and other permanent storage. Additionally, a durable non-transitory computer readable storage medium may include tangibly embodied volatile storage such as RAM, buffers, cache memory, and network circuits. Furthermore, according to various other implementations, the computer readable medium may comprise computer readable information in a transitory state medium such as a network link and/or a network interface, including a wired network or a wireless network that allow a computer to read such computer readable information.

Although specific implementations of the subject matter have been disclosed, those having ordinary skill in the art will understand that changes can be made to the specific implementations without departing from the scope of the disclosed subject matter. The scope of the disclosure is not to be restricted, therefore, to the specific implementations, and it is intended that the appended claims cover any and all such applications, modifications, and implementations within the scope of the present disclosure.

What is claimed is:

1. A method for providing customer support from a remote representative system to a local customer system, the method operating within an intermediary interface system locally coupled to the local customer system and wirelessly coupled to the remote representative system, the method comprising:
   receiving a video signal from the local customer system;
   wirelessly transmitting the video signal to the remote representative system;
   wirelessly receiving a remote user input signal from the remote representative system;
   formatting the remote user input signal to correspond to a user input signal originating from a hardware user interface device locally coupled to the local customer system;
   transmitting the remote user input signal to the local customer system; and
   wherein the local customer system has no network connection to the remote representative system other than through the intermediary interface system and wherein the only signals received by the local customer system from the remote representative system are remote user input signals.

2. The method according to claim 1 wherein the hardware user interface device includes at least one of a keyboard and a mouse.

3. The method according to claim 1 wherein the intermediary interface system includes
   a dongle that provides for wire coupling to the local customer system for receiving the video signal from the local customer system and for transmitting the hardware user input signal to the local customer system, and
   a smartphone application for configuring the smartphone to couple to the dongle and to provide for wirelessly coupling to the remote representative system for wirelessly transmitting the video signal and for wirelessly receiving the remote user input signal.

4. The method according to claim 3 wherein the dongle includes a first port for wire coupling to at least one of a keyboard port and a mouse input port of the local customer system for transmitting the hardware user input signal and a second port for wire coupling to a video output port of the local customer system for receiving the video signal.

5. The method according to claim 1 further wherein the intermediary interface system includes a microphone for receiving a customer audio signal, and the wirelessly transmitting further includes wirelessly transmitting the customer audio signal received by the microphone.

6. The method according to claim 1 further wherein the wirelessly receiving further includes wirelessly receiving a remote representative audio signal and the intermediary interface system includes a speaker for locally annunciating the representative audio signal.

7. The method according to claim 6 further wherein the intermediary interface system includes a microphone for locally receiving a customer audio signal, and the wirelessly transmitting further includes wirelessly transmitting the customer audio signal received by the microphone.

8. The method according to claim 1 wherein the intermediary interface system includes a smartphone having
   a radio frequency transceiver for wirelessly coupling to remote representative system, and
   a camera for receiving the video signal from a monitor of the local customer system.

9. The method according to claim 8 wherein the smartphone includes an output port for wire coupling to a user input device input port on the local customer system.

10. The method according to claim 9 wherein the wire coupling includes a USB wired interface.

11. The method according to claim 1 further comprising the step of authenticating a session for facilitating a secure communication link between the remote representative system and the intermediary interface system.

12. A non-transitory computer readable storage medium comprising a computer program which instructs a computer to perform a method comprising:
   receiving a video signal from a local customer system;
   wirelessly transmitting the video signal to a remote representative system;
   wirelessly receiving a remote user input signal from the remote representative system;
   formatting the remote user input signal to correspond to a user input signal originating from a hardware user interface device locally coupled to the local customer system;
   transmitting the remote user input signal to the local customer system; and
   wherein the local customer system has no network connection to the remote representative system other than through the hardware user interface device and wherein the only signals received by the local customer system from the remote representative system are remote user input signals.

13. A dongle device for facilitating provision of customer support from a remote representative system to a local customer system, the device comprising:
   a dongle port for providing a wire interface to a video output port and an at least one user input port of the local customer system, the dongle port for receiving a video signal from the video output port and for transmitting a hardware user input signal to the local customer system;
   a modular connection interface for providing an interface between the dongle device and a wireless transceiver, the wireless transceiver wirelessly coupled to the remote representative system; and a module operating within the wireless transceiver for instructing a computer within the wireless transceiver to cause the wireless transceiver to receive the video signal from the dongle device, wirelessly transmit the video signal to the remote representative system, wirelessly receive a remote user input signal from the remote representative system, and transmit the remote user input signal to the dongle device; and wherein the local customer system has no network connection to the remote representative system other than through the dongle device and wherein the only signals received by the local customer system from the remote representative system are the remote user input signal.

14. The dongle device according to claim 13 wherein the module includes a computer program comprised within a non-transitory computer readable storage medium.

15. The dongle device according to claim 13 further comprising a video conditioning circuit for conditioning the video signal for transmission by the wireless transceiver to the remote representative system.

16. The dongle device according to claim 13 wherein the modular connection interface includes one of a WiFi interface, a Bluetooth interface, an NFC interface, and a hardwire interface.

17. The dongle device according to claim 13 wherein the wireless transceiver is included within a smartphone wirelessly coupled to the remote representative system through a network including a cellular network.

18. The dongle device according to claim 13 further for authenticating a session for facilitating a secure communication link between the remote representative system and the dongle device.

* * * * *